United States Patent [19]

Williams

[11] 4,194,273
[45] Mar. 25, 1980

[54] ATTACHMENT FOR FISHING LINES AND TACKLE

[76] Inventor: Ross S. Williams, 48 Karingal Dr., Frankston, Victoria, 3199, Australia

[21] Appl. No.: 879,495

[22] Filed: Feb. 21, 1978

[30] Foreign Application Priority Data

Feb. 21, 1977 [AU] Australia .............................. PC9125

[51] Int. Cl.² ............................................. A01K 91/04
[52] U.S. Cl. .................................... 24/222; 43/42.74; 43/44.92
[58] Field of Search ....................... 24/222, ; 43/44.84, 43/44.85, 44.86, 42.71, 42.74, 43.12, 44.92; 403/169

[56] References Cited

U.S. PATENT DOCUMENTS

| 143,144 | 9/1873 | Hamm | 24/222 R |
|---|---|---|---|
| 231,999 | 9/1880 | Cleveland | 24/222 R |
| 633,401 | 9/1899 | Swearingen | 24/222 R |
| 657,683 | 9/1900 | Swearingen | 24/222 R |
| 857,901 | 6/1907 | Pilkington | 24/222 R |
| 893,935 | 7/1908 | Moore | 24/222 R |
| 1,851,730 | 3/1932 | Rutherford | 24/222 R |
| 2,644,263 | 7/1953 | Allen | 43/42.74 |
| 3,930,330 | 1/1976 | Black | 43/43.12 |

FOREIGN PATENT DOCUMENTS

| 26784 of 1903 | United Kingdom | 24/222 R |
|---|---|---|
| 918566 | 2/1963 | United Kingdom | 403/164 |

Primary Examiner—Kenneth Downey
Attorney, Agent, or Firm—Cushman, Darby & Cushman

[57] ABSTRACT

This invention relates to an attachment for fishing lines and tackle and comprises two members moulded from thermo-plastic material and being adapted to be flexibly snap-locked to each other, one member being a primary member for attachment to a main fishing line and the other member being a secondary member for carrying a trace line, the members being provided with notches or the like which receive and positively locate one or more trace lines or the like in predetermined fixed positions.

6 Claims, 14 Drawing Figures

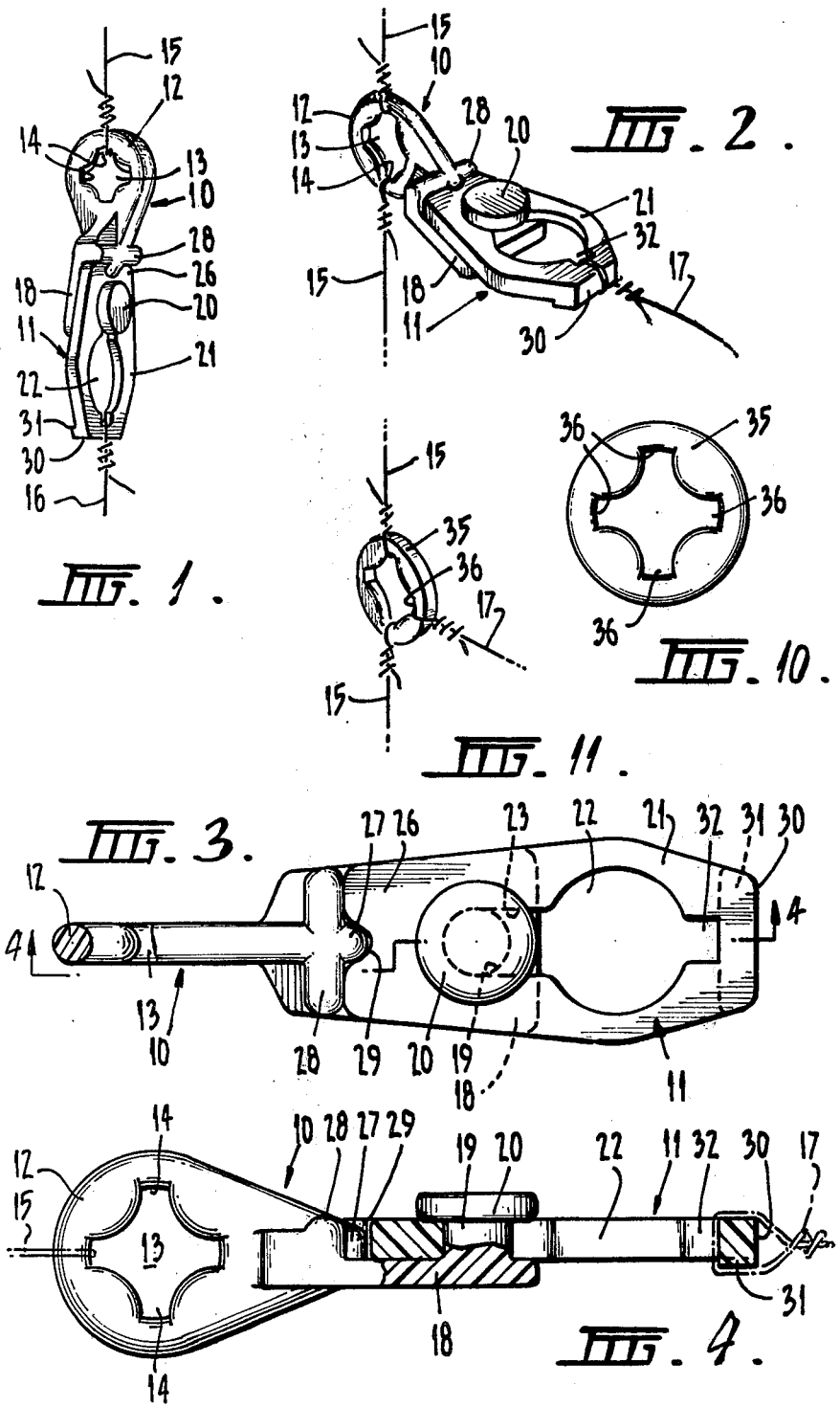

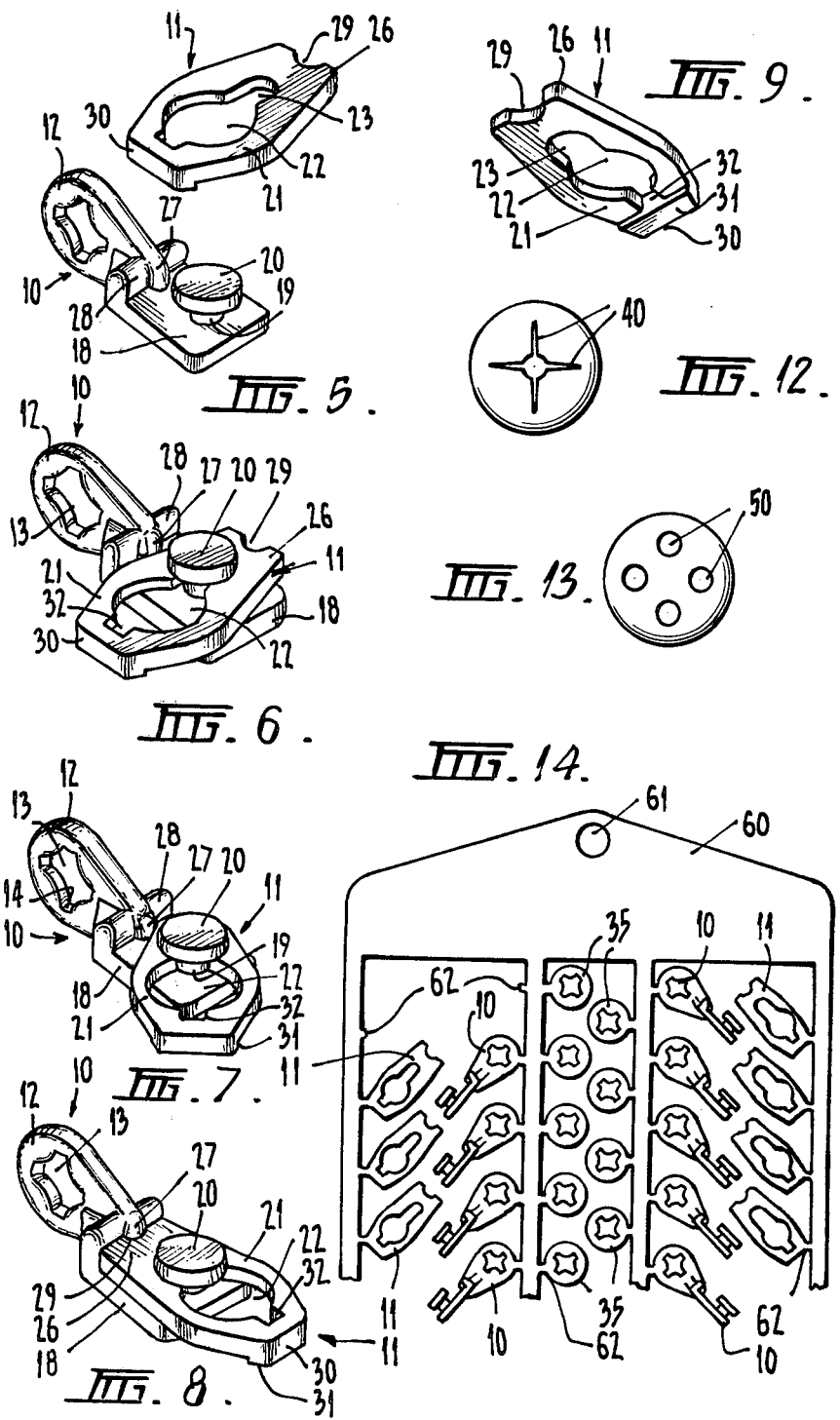

ATTACHMENT FOR FISHING LINES AND TACKLE

The present invention relates to an attachment for fishing tackle and refers more particularly to a line attachment whereby hooks and/or sinkers may be readily attached or changed without the necessity of cutting and re-tying the line.

It is known to provide a fishing line attachment which provides for the changing of lures or the like, such devices being made of metal and comprising a swivel connection and a safety pin type snap which loops through the attachment ring of a lure. Such devices can also be used to join two lines together such as the main line and a trace by using a small brass or steel ring instead of the attachment loop of a lure. These devices are quite satisfactory for an in-line function but are quite unsatisfactory for the attachment of branch lines in that the branch line twists around the main line due to the fact that the branch line cannot retain a permanent setting and simply twists on the swivel.

It is an object of the present invention to provide a fishing line attachment which has the advantages of the known swivel attachment and which overcomes the disadvantages of said attachment by enabling branch lines to retain their setting.

The invention accordingly resides in an attachment for fishing lines and tackle comprising first and second members adapted for interlocking attachment to each other, said first member having means enabling a plurality of fishing lines to be attached thereto at predetermined fixed positions and said second member also having means for the attachment of a fishing line in a predetermined fixed position.

More particularly, the members are moulded from thermo-plastic material as an assembly in a frame, each member being attached to the frame by a frangible connection.

Other features of the invention will be readily apparent from the following description wherein reference is made to the accompanying drawings in which:

FIG. 1, is a perspective view of an attachment for fishing lines and tackle according to the invention, FIG. 2, is a perspective view of the attachment of FIG. 1 arranged as a branch connection, FIG. 3, is a plan view of the attachment, FIG. 4, is an elevational view taken along line 4—4 of FIG. 3, FIGS. 5 to 8, are perspective views showing the manner of connection of the respective members.

FIG. 9, is an underneath perspective view of the trace connecting member,

FIG. 10, is a plan view of a line connecting ring,

FIG. 11, is a perspective view of a ring according to FIG. 10, connected to a plurality of lines, FIGS. 12 & 13, are plan views of further embodiments of line connecting rings, and FIG. 14, is a plan view of a moulded assembly of components according to the invention.

The attachment according to FIGS. 1 to 8 comprises a line attaching member 10 and a trace attaching member 11 both of which are moulded from thermo-plastic material such as Nylon. The line attaching member 10 has a ring portion 12 with a star shaped opening 13 therein. Each of the points 14 of the star shaped opening 13 is substantially square in cross-section so as to provide an efficient knot connection when a line 15 is attached thereto. As may be seen in FIGS. 1 to 8, three lines may be attached to the ring 12, one at each of the points 14.

In FIG. 1 the attachment is a simple in-line attachment, line 15 being the main fishing line and line 16 being the trace line whereas in FIG. 2 the attachment is an insertion in the main line 15 to provide for a branch trace line 17.

FIGS. 3 to 8, which illustrate the invention in detail show the manner in which the respective members 10 and 11 are connected and locked together. The line connecting member 10 has a ring portion 12 as aforesaid and a substantially planar portion 18. The planar portion 18 has an upstanding stud 19 with an enlarged head 20 which is adapted to receive the trace connecting member 11 and secure same in locking engagement. The member 11 is a substantially planar moulded piece having a keyhole shaped opening 21 therein. As will be seen from FIGS. 5 to 8 the member 11 is connected to the member 10 by placing said member 11 over the stud 19 whereby the larger diameter portion 22 of the keyhole opening 21 enables said stud 19 to pass freely therethrough. The member 11 is then moved axially causing the stud 19 to enter the slot 23 of the keyhole opening (FIG. 6), the large head 20 of the stud now preventing the member 11 from being attached. Once the stud 19 reaches the end of the slot 23 the members 10 and 11 are rotated in the directions of the arrows 24 and at the same time they are bent downwardly in the directions of the arrows 25 causing the members 10, 11 to separate slightly at their central connecting point, thus permitting the end 26 of the member 11 to snap over a lug 27 on an upstanding shoulder stop portion 28 of the member 10 to locate said lug 27 in a recess 29 in the end 26 of said member 11. Once located in this position it is impossible to move the member 11 in a longitudinal direction, such movement being prevented by reason of the end 26 abutting against the shoulder 28. Furthermore, in this locked position, relative rotational movement of the members is prevented by reason of the lug 27 engaging in the recess 29.

The outer or trace connecting end 30 of the member 11 is provided with an integrally moulded reinforcement 31 of substantially rectangular cross-section, said reinforcement being to prevent the trace line 16 from pulling through or snapping the end 30 at the line connecting slotted section 32. As mentioned hereinbefore, the slotted section 32 is rectangular in cross-section to provide for an efficiently tied knot connection.

When it is desired to provide a plurality of trace lines a ring 35 as illustrated in FIGS. 10 and 11 may be used. The ring 35 is substantially identical to the ring portion 12 of the member 10 and is capable of having a line attached at each of the four points 36. As shown in FIG. 11, the main line 15 is attached to two of the points 36 and a trace line 17 is attached to a third point.

FIGS. 12 and 13 illustrate alternative ring constructions wherein in lieu of the star shaped cut-out 13 there are provided slots 40 (FIG. 12) or holes 50 (FIG. 13).

FIG. 14 shows an assembly of the components 10, 11 and 35 moulded as a unitary structure in a thermo-plastic frame 60. The frame 60 has a hole 61 at the top whereby the frame can be hung in a convenient position. The respective components are moulded to the frame and may be readily detached as required by snapping them off or cutting them at their frangible connections 62.

By the present invention, it is possible for a fisherman to readily exchange hooks or tackle as required by simply detaching the member 11 from member 10 and replacing it with the desired replacement.

There is no need to cut or tie the line.

I claim:

1. An attachment for fishing lines and tackle comprising moulded thermoplastic first and second members adapted for interlocking attachment to each other, said first member having ring means for the attachment of one or more fishing lines, said ring means having a central opening of irregular dimensions whereby a plurality of peripheral indentations are formed providing predetermined spaced line tying positions; said first member also having a stud with enlarged head for receiving and retaining said second member in locking engagement, said second member having a keyhole opening enabling said second member to pass over said stud and secure therebehind, said second member having an additional slot extending radially outwardly of the larger portion of said keyhole opening thereby providing for the attachment of a fishing line diametrically opposite the slot of said keyhole opening.

2. An attachment as claimed in claim 1 wherein said second member is formed at its line tying position with a reinforced edge of greater thickness than the remainder of said member, the portion of greater thickness being of rectangular cross-section whereby to additionally prevent slipping of the fishing line.

3. An assembly of first and second members of the kind claimed in claim 1, moulded from thermo-plastic as a unitary structure within frame means, each said member being connected to the frame means by a frangible connection.

4. An assembly as claimed in claim 3 characterized in that said frame means also includes a plurality of rings each of which has a plurality line tying notches in or about its periphery.

5. An attachment for fishing lines and tackle comprising: a first moulded thermoplastic member having a ring-shaped portion which has a central opening notched at spaced intervals around its periphery so as to form a plurality of indented line-tying positions each of which prevents a line from slipping around the circumference of the central opening once the line has been tied around the ring-shaped portion at the location of the respective notch, said first member having a planar portion integral with said ring-shaped portion and lying in a plane which is transverse to the plane of said opening in said ring-shaped portion and which is parallel to the axis of said opening, said planar portion having a stud extending therefrom at a right angle to the plane of said planar portion, said stud having an enlarged head; and a second moulded thermoplastic member having a keyhole-shaped opening therein formed by a portion of enlarged dimension and a slot portion of reduced dimension for receiving the stud so as to releasably lock said second member between the enlarged head of the stud and said planar portion of said first member, said second member having a slot extending radially outwardly of the keyhole portion of enlarged dimension at a location diametrically opposite the portion of reduced dimension thereby providing for the attachment of a fishing line at that location.

6. An attachment as in claim 5 wherein said second member is a planar member of generally uniform cross-section except at the edge portion adjacent said slot, said edge portion being of greater thickness and of rectangular cross-section so as to aid in preventing slipping of a fishing line attached at the location of said slot.

* * * * *